(12) United States Patent
Bandi

(10) Patent No.: US 10,742,040 B2
(45) Date of Patent: Aug. 11, 2020

(54) SYSTEM AND METHOD OF DETERMINING FORECAST ERROR FOR RENEWABLE ENERGY FLUCTUATIONS

(71) Applicant: Okinawa Institute of Science and Technology School Corporation, Kunigami-Gun, Okinawa (JP)

(72) Inventor: Mahesh M. Bandi, Okinawa (JP)

(73) Assignee: Okinawa Institute of Science and Technology School Corporation, Kunigami-Gun (JP)

( * ) Notice: Subject to any disclaimer, the term of this patent is extended or adjusted under 35 U.S.C. 154(b) by 114 days.

(21) Appl. No.: 15/553,117

(22) PCT Filed: Feb. 23, 2016

(86) PCT No.: PCT/JP2016/000950
§ 371 (c)(1),
(2) Date: Aug. 23, 2017

(87) PCT Pub. No.: WO2016/136237
PCT Pub. Date: Sep. 1, 2016

(65) Prior Publication Data
US 2018/0019595 A1 Jan. 18, 2018

Related U.S. Application Data

(60) Provisional application No. 62/119,304, filed on Feb. 23, 2015.

(51) Int. Cl.
*H02J 3/38* (2006.01)
*G05B 17/02* (2006.01)
(Continued)

(52) U.S. Cl.
CPC .............. *H02J 3/386* (2013.01); *G05B 17/02* (2013.01); *G06F 17/17* (2013.01); *H02J 3/003* (2020.01); *Y02E 10/763* (2013.01)

(58) Field of Classification Search
CPC ..... H02J 3/386; H02J 2003/003; G06F 17/17; G05B 17/02; Y02E 10/763
See application file for complete search history.

(56) References Cited

U.S. PATENT DOCUMENTS 6,858,953 B2 * 2/2005 Stahlkopf ................. H02J 3/32
290/44
6,909,198 B2 * 6/2005 Ragwitz .................. F03D 7/043
290/44
(Continued)

FOREIGN PATENT DOCUMENTS

CN 102914969 A 2/2013
CN 103366225 A 10/2013
(Continued)

OTHER PUBLICATIONS

Extended European Search Report dated Jun. 20, 2018 during the prosecution of European Patent Application No. PCT/JP2016000950.
(Continued)

*Primary Examiner* — Charles R Kasenge
(74) *Attorney, Agent, or Firm* — Troutman Sanders LLP

(57) ABSTRACT

A system for determining (a) forecast error and/or (b) scaling error for wind power generation is provided, the system utilizing generated and forecast time series for power generation derived from wind and analyzing temporal correlations in the wind fluctuations to quantify: (a) the forecast error defined by deviations between the high frequency components of the forecast and generated time series, and (b) a scaling error defined by a degree that temporal correlations fail to be predicted for an accurate predictor of wind fluctuations. Wind fluctuations may exhibit multi-fractal behavior at the turbine level and/or may be rectified to a
(Continued)

fractal structure at the grid level. A memory kernel may be used to reduce the forecast and scaling errors.

16 Claims, 9 Drawing Sheets

(51) Int. Cl.
    *G06F 17/17*           (2006.01)
    *H02J 3/00*            (2006.01)

(56) References Cited

U.S. PATENT DOCUMENTS

| | | | |
|---|---|---|---|
| 7,177,728 B2 | 2/2007 | Gardner | |
| 9,136,706 B2* | 9/2015 | Mitsumoto | H02J 3/00 |
| 9,366,227 B2* | 6/2016 | Garcia | H02J 3/18 |
| 10,079,317 B2* | 9/2018 | Gonatas | H01L 31/02021 |
| 2003/0160457 A1* | 8/2003 | Ragwitz | F03D 7/043 |
| | | | 290/44 |
| 2005/0015283 A1 | 1/2005 | Iino et al. | |
| 2005/0143865 A1 | 6/2005 | Gardner et al. | |
| 2007/0035135 A1* | 2/2007 | Yoshida | F03D 7/0284 |
| | | | 290/44 |
| 2007/0192241 A1 | 8/2007 | Metlapalli | |
| 2011/0202191 A1 | 8/2011 | Larsson et al. | |
| 2013/0013233 A1* | 1/2013 | Murakami | H02J 3/38 |
| | | | 702/60 |
| 2013/0168963 A1* | 7/2013 | Garcia | H02J 3/18 |
| | | | 290/44 |
| 2013/0173075 A1* | 7/2013 | Mitsumoto | H02J 3/00 |
| | | | 700/291 |
| 2014/0152258 A1* | 6/2014 | LePort | H02J 7/007 |
| | | | 320/116 |
| 2014/0172182 A1 | 6/2014 | Subbotin et al. | |
| 2015/0039228 A1* | 2/2015 | Wang | G01W 1/00 |
| | | | 702/3 |
| 2015/0241304 A1* | 8/2015 | Brummel | G05B 23/024 |
| | | | 702/35 |

FOREIGN PATENT DOCUMENTS

| | | |
|---|---|---|
| CN | 103440529 A | 12/2013 |
| CN | 103473461 A | 12/2013 |
| CN | 102792542 B | 1/2015 |
| CN | 104969437 A | 10/2015 |
| JP | 2004-19583 A | 1/2004 |
| JP | 2007-100503 A | 4/2007 |
| JP | 2010-57262 A | 3/2010 |
| JP | 2011-200040 A | 10/2011 |

OTHER PUBLICATIONS

Communication pursuant to Article 94(3) EPC issued in corresponding European Patent Application No. 16 754 988.0 dated Mar. 19, 2019.
Notification of the First Office Action issued in corresponding Chinese Patent Application No. 201680011691.2 dated Aug. 28, 2019 (with English translation).
Mackay, D.J.C., Sustainable Energy-Without the Hot Air, UIT Cambridge, Version 3.5.2, Nov. 3, 2008.
Milan, P. et al., "Turbulent Character of Wind Energy," Physical Review Letters 100, Mar. 29, 2013.
Apt, J., "The Spectrum of Power From Wind Turbines," Journal of Power Sources 169 (2007) 369-374.
Calif R. et al., "Multifractual and Local Correlation of Simultaneous Wind Speed-Power Output from a Single Wind Trubine," Geophys., vol. 16, (2014) 15443 Res. Abstr.
Wiser, R. et al., "Wind Energy," Chapter 7, pp. 535-607 Cambridge University Press, Cambridge, United Kingdom and New York, N.Y. USA (2011).
Jacobson, M. et al., "A Path to Substainable Energy by 2030," Sci. Am. 301 pp. 58-65, (2009).
Katzenstein W. et al., "The Variability of Interconnected Wind Plants", Energy Policy 38, pp. 4400-4410, (2010).
Eirgrid Group, "Tomorrow's Energy Scenarios," available at http://eirgrid.com/operations/systemperformancedata/windgeneration/ (2015).
Irish Wind Energy Association, "Wind Energy in Ireland," (http://iwea.com/faqs), accessed Jun. 23, 2017.
Muzy J F, et al., "Intermittency of Surface-Layer Wind Velocity Series in the Mesoscale Range," Phys. Rev. E 81 056308_1-056308_12 (2010).
Lovejoy, S. et al., "Direct Evidence of Multifractual Atmospheric Cascades from Planetary Scales Down to 1 Km," Phys. Rev. Lett. vol. 86 No. 22, 5200 (2001).
Lueken, C. et al., "Costs of Solar and Wind Power Variability for Reducing Co2 Emission," Environ. Sci. Technol. 46, 9761-9767 (2012).
Katzenstein, W. et al., "The Cost of Wind Power Variability," Energy Policy, 51, 233-243 (2012).
Matos, M., "Setting the Operating Reserve Using Probabilistic Wind Power Forecasts," IEEE Trans. Power Syst. 26, No. 2, 594-603 (2011).
Tande, J. O., "Exploitation of Wind-Energy Resources in Proximity to Weak Elctric Grids," Appl. Energy 65, 395-401 (2000).
Albadi, M.H. et al., "Overview of Wind Power Intermittency Impacts on Power Systems," Electr. Power Syst. Res. 80, 627-632 (2010).
Fabbri, A. et al., "Assessment of the Cost Associated with Wind Generation Prediction Erros in a Liberalized Electricity Market," IEEE Trans. Power Syst. vol. 20, 1440-1446 (2005).
Parsons, B. et al., "Grid Impacts of Wind Power: A Summary of Recent Studies in the United States," Wind Energy, 7:87-108 (2004).
Costa A. et al., "A Review of the Young History of the Wind Power Short-Term Prediction," Renew. Sustainable Energy Rev. 12, 1725-1744 (2008).
Doherty, R. et al., "A New Approach to Quantify Reserve Demand in Systems With Significant Installed Wind Capacity," IEEE Trans. Power Syst. vol. 20, No. 2, 587-595 (2005).
Bludszuweit, H. et al., "Statistical Analysis of Wind Power Forecast Error," IEEE Trans. Power Syst. vol. 23, No. 3, 983-991 (2008).
Hodge, B.M. et al., "Wind Power Forecasting Error Distributions over Multiple Timescales," NREL Report No. NREL/CP-5500-50614 (2011).
Hodge B. M. et al., "Characterizing and Modeling Wind Power Forecast Errors from Operational Systems for Use in Wind Integration Planning Studies," Wind Eng. vol. 23 No. 5, 509-524 (2012).
Hodge B M et al. "Wind power forecasting error distributions: an international comparison," Tech. Rep National Renewable Energy Laboratory, Conference Paper 5500-56130 (2012).
Wu, J., "Statistical Distribution for Wind Power Forecast Error and Its Application to Determine Optimal Size of Energ Storage System," Electr. Power Energy Syst. 55, 100-107 (2014).
Madsen, H. et al., "Standardizing the Performance Evaluation of Short-Term Wind Power Prediction Models," Wind Eng. vol. 29, No. 6, pp. 475-489, (2005).
Lange, M., "On the Uncertainty of Wind Power Predictions—Analysis of the Forecast Accuracy and Statistical Distribution of Errors," 2005 J. Sol. Energy Eng. 127 177.
Katul, G.G. et al., "Intermittency, Local Isotropy, and non-Gaussian Statistics in Atmospheric Surface Layer Turbulence," Phys. Fluids 6, 2480 (1994).
Weber, C., "Adequate Intraday Market Design to Enable the Integration of Wind Energy into the European Power Systems", Energy Policy 38, 3155-3163 (2010).
Lang S.C. et al., "Forecasting total wind power generation on the republic of ireland grid with a multi-scheme ensemble prediction system," Proc. Global Wind Energy Conf. GWEC Adelaide (2006).
Lang, S. et al., "Forecasting Wind Generation, Uncertainty and Reserve Requirement on the Irish Power System using an Ensemble Prediction System," Wind Eng. 33 433-48 (2009).

(56) References Cited

OTHER PUBLICATIONS

European Power Exchange, "Continuous Cross-Border Intraday Trading Mechanism on France-Germany Using ComXerv," German TSO Intraday Market: www.epexspot.com/en/product-info/Intraday/germany, accessed Jun. 23, 2017 (2010).

Kolmogorov, A.N., Dissipation of Energy in the Locally Isotropic Turbulence, Mathmatical and Physical Sciences, vol. 434, No. 1890, pp. 15-17, (1991).

Frisch U 1995 Turbulence: The Legacy of A. N. Kolmogorov (Cambridge: Cambridge University Press) 89-91 (1995).

Bandi M. M. et al., "Energy Flux Fluctuations in a Finite Volume of Turbulent Flow," Phys. Rev. E 73 026308 (2006).

Samorodnitsky, G. et al., Stable Non-Gaussian Random Processes (New York: Chapman and Hill) (1994).

Anselmet F. et al., "High-order velocity structure functions in turbulent shear flows," J. Fluid Mech. vol. 140, 63-89 (1984).

Mandelbrot, B. et al., "Beyond Cartoons: The Multifractal Model with No Grids," The Misbehaviour of Markets: A Fractal View of Financial Turbulence (New York: Basic Books) (2004).

Chen, S. et al., "Anomalous Scaling of Low-Order Structure Functions of Turbulent Velocity," J. Fluid Mech. 533 183-192 (2005).

Larkin, L. et al., "Power-Law Distributions of Particle Concentration in Free-Surface Flows," Phys. Rev. E 80 066301 (2009).

Calif, R. et al., "Multifractal Description of Wind Power Fluctuations of Using Arbitrary Order Hilbert Spectral Analysis," Physica A 392 4106-4120 (2013).

Kuznetsov, V. R., "Fine-Scale Turbulence Structure of Intermittent Shear Flows," J. Fluid Mech. vol. 243, 595-622 (1992).

Billinton, R. et al., "Reliability Evaluation of Power Systems," (New York: Plenum) 2nd Ed., Springer Sceience + Business Media New York (1986).

Pesch, T. et al., "A New Markov-Chain-Realted Statistical Approach for Modelling Synthetic Wind Power Time Series," IOP Publishing, New J. Phys. 17 055011 (2015).

Bel, G. et al., "The Relationship Between the Statistics of Open Ocean Currents and the Temporal Correlations of the Wind Stress," New J. Phys. 15 053024 (2013).

Levy, P., Theorie de l'addition des variables aleatoires (Gauthier Villars: Paris) (1954).

International Search Report dated May 10, 2016 during the prosecution of corresponding PCT International Application No. PCT/JP2016/000950.

Notice of Reasons for Refusal issued in corresponding Japanese Patent Application No. 2017-542194 dated Apr. 7, 2020, with machine translation.

Alexiadis, M. C. et al., "Wind Speed and Power Forecasting based on Spatial Correlation Models" IEEE Transations on Energy Conversion 14(3):836-842 Sep. 1999—[search on Mar. 26, 2], Internet <URL:https://ieeexplore.eee.org/stampistamp.jsp?tp=&amumber=790962> (EPO presentation document) cited in JP OA submitted herewith.

Pinson, P. et al., "Wind Power Forecasting using Fuzzy Neural Networks Enhanced with On-line Predictino Risk Assessment." IEEE Bologna PowerTech Conference vol. 2 Jun. 23, 2003—[search on Mar. 26, 2], Internet <URL: https://ieeexplore.ieee.org/stamp/stamp.jsp?tp=8,arnumber=1304289> (EPO presentation document) sited in JP OA submitted herewith.

Notification of the Second Office Action issued in corresponding Chinese Patent Application No. 2020042802295960 dated May 6, 2020, with translation.

\* cited by examiner

Book: Sustainable Energy: Without the hot air, DJC MacKay

Katzenstein W, Fertig E and Apt J 2010 Energy Policy 38 4400

SYSTEM AND METHOD OF DETERMINING FORECAST ERROR FOR RENEWABLE ENERGY FLUCTUATIONS

CROSS-REFERENCE TO RELATED APPLICATIONS

This is a U.S. national phase application under 35 U.S.C. § 371 of International Patent Application No. PCT/JP2016/000950, filed on Feb. 23, 2016, and claims benefit of priority to U.S. Provisional Patent Application No. 62/119,304, filed Feb. 23, 2015. The entire contents of these applications are hereby incorporated by reference.

TECHNICAL FIELD

The disclosed technology generally relates to systems of forecasting wind power.

BACKGROUND

Renewable power generation, and wind power in particular, fluctuates due to natural variation in the energy source. For example, atmospheric turbulence has been known to fluctuate as well as the wind itself sharing spectral features of the turbulent wind from which it derives energy. Regarding wind specifically, whereas distributed wind farms are intended to smooth these fluctuations, power entering the grid that is generated from wind still fluctuates wildly which poses a risk of increased grid instability and corresponding reserve costs.

To manage these fluctuations, utility operators may use forecast models to predict these fluctuations over a future time horizon (e.g., few hours to 1 day). This is done to account for operating reserves known as standby power needed for demand not met by the fluctuating renewable energy sources. This is also done to protect grid infrastructure from instability and black-out risk owing to sudden surges in power from strong fluctuations in the renewable energy source.

Forecast models inherently are never perfectly accurate and the degree of robustness to be incorporated in to smart-grids depends upon accuracy of forecast error and how this error varies over time. In turn, knowledge of this accuracy helps determine response time requirements when designing the modern, smart-grid.

Accordingly, a solution that imparts a reliable manner to capture and/or mitigate the accuracy of forecast error as well as the time variation of error may be needed. It is with respect to these and other considerations that the various embodiments described below are presented.

SUMMARY OF THE INVENTION

In some aspects, the disclosed solution relates to a computer-readable storage medium that may be used to store a program operable to manage energy production in an energy grid based on a physical quantity whereby the program causes a computer to execute a first process. The first process may include a (1-1)-th step that fixes n to an integer equal to 1 or greater. A (1-2)-th step may also be included in the first process that makes a calculation shown in a formula (1) regarding the physical quantity, $P_G(t)$, $P_G(t)$ being represented as a function of a time t and a predicted value of the physical quantity, $P_F(t+\tau)$, at a time t+τ when a fixed time τ passes from the time t according to the following function: $(|P_F(t+\tau)-P_G(t)|)^n \ldots (1)$. It is to be understood that function $P_G(t)$ may correspond to generated power for a particular grid whereas function $P_F(t)$ may correspond to forecasted power as to a particular renewable energy source such as wind.

The program may also execute a (1-3)-th step that calculates a first average value as an average value of the formula (1) when the time t is varied for a fixed period. A (1-4)-th step may also be executed that calculates a first average value when the τ is varied. A (1-5)-th step may be executed by the program that performs the (1-1)-th step to the (1-4)-th step at least once for the integer that is different from the integer n in the (1-1)-th step. A (1-6)-th step may also be executed that calculates a time scaling error in accordance with a numeric of the integer n from the first average value calculated in the (1-4)-th step and the first average value calculated in the (1-5)-the step.

The program may also include a second process including a (2-1)-th step that fixes n to the integer equal to 1 or greater. A (2-2)-th step of the second process may be included that makes a calculation shown in a formula (2) regarding the physical quantity, $P_G(t)$ represented as the function of the time t and the physical quantity, $P_G(t+\tau)$ at the time t+τ when the fixed time ti passes from the time t, $(|P_G(t+\tau)-P_G(t)|)^n \ldots (2)$. A (2-3)-th step may also be included in the second process that calculates a second average value as the average value of the formula (2) when the time t is varied for the fixed period. A (2-4)-th step may be included in the second process that calculates a second average value when the time τ is varied. A (2-5)-th step may also be included in the second process that makes an evaluation to determine whether the second average value is proportional to $\tau^A$ and calculates A when proportional. A (2-6)-th step may also be included that performs the (2-1)-th step to the (2-5)-th step at least once for the integer that is different from the integer n in the (2-1)-th step. A (2-7)-th step may also be included that calculates a slope A when a relationship between the A calculated in the (2-5)-th step and the (2-6)-th step and the integer n is approximated as a linear line.

The program may also include a third process including a (3-1)-th step that performs the (1-1)-th step to the (1-4)-th step of the first process. A (3-2)-th step may also be included in the third process that determines whether the first average value is proportional to $\tau^B$ and calculates B when proportional. A (3-3)-th step may also be included in the third process that performs the (3-1)-th step and the (3-2)-th step at least once for the integer that is different from the integer n in the (3-1)-th step. A (3-4)-th step that calculates a B slope when the relationship between the B calculated in the (3-2)-th step and the (3-3)-th step and the integer n is approximated as a linear line.

The program may also include a fourth process having a (4-1)-th step that calculates a scaling error from a difference between the A slope calculated in the (2-7)-th step and the B slope calculated in the (3-4)-th step.

In certain embodiments, the physical quantities $P_G$ and/or $P_F$ may be derived from a wind speed used for wind power generation, sunlight used for solar power energy production, or rotation in general of any renewable energy turbine rotated by naturally occurring energy (e.g. hydro turbines caused to rotate by water flow). The program may be executed by being downloaded from a server or by being accessed locally on a local non-transitory computer readable storage medium. The program may also be executed by being read from a computer readable storage medium.

In another aspect, a method is disclosed for determining time-dependent forecast error in an energy grid. This method may include the following steps: introducing a data set defined by an identified generated power trend and an identified forecast power trend of the energy grid across a time period, each of the identified generated and forecast power trends being based on a physical process; producing a statistical structure by comparing the identified generated and forecast power trends and analyzing the data set to identify temporal error variations defined by temporal correlated fluctuations between the identified generated power trend and the forecast power trend; calculating the time-dependent forecast error comprised of a time-scaling error and a scaling error based on the statistical structure derived from the physical process; and analyzing the time-dependent forecast error to determine a predicted value of energy fluctuations of the physical process associated with the identified generated and forecast power trends used to manage the energy grid.

In this method, the physical process may be wind power and the energy grid may include a plurality of geographically distributed wind farms having one or more wind turbines. The time period may also be measured using a sampling rate of $1/\Delta t$. In this respect, the time t could range between 1 minute and 30 minutes but the solution embodied by this method is not limited. Instead, any time t could be used as need or required. The method may also include utilizing the statistical structure in a memory kernel to reduce timescale and scaling errors.

The correlated fluctuations in certain embodiments can include data associated with wind turbines (e.g. turbulence) of the plurality of geographically distributed wind farms. In this respect, when the fluctuations defined by turbulence exhibit fractal scaling, the method can further include quantifying the correlated fluctuations with a scaling exponent using a predetermined structure function such as the following: $S_n(\tau)=\langle[|x(t+\tau)-x(t)|]^n\rangle$, wherein each time-varying function x(t) at time t is subtracted from a time-varying signal x(t+τ) at a later time (t+τ) so that an absolute difference can determine one of the plurality of correlated fluctuations.

In certain aspects, the step of analyzing the identified trends can ignore differences between the plurality of geographically distributed wind farms and one or more additional wind farms added to the energy grid and/or also ignore differences between seasonal variability of the wind power.

The method in certain aspects can also include the steps of identifying the identified generated and forecast power trends; and inverting frequencies having maximal amplitudes. Preferably, the generated and forecast power trends are identified using a fast Fourier transform but the method is not so limited any method of de-trending can be used as needed or required including singular spectrum analysis or de-trended component analysis. In certain aspects of this embodiment, the method may also include: determining a number of maximal amplitudes contributing to the identified trends being varied; analyzing the number of maximal amplitudes across the time period to split the time period into a plurality of independent windows; and computing structure functions for each window to determine variation between the identified generated and forecast power trends. A modified forecast power trend may also be introduced into the statistical structure based on the identified forecast power trend and then modified with an exponentially decaying memory kernel derived from the identified generated power trend.

In those aspects of the method where wind power is the physical process, an autocorrelation function may be used between the identified generated power trend and the forecast power trend to determine a characteristic decay time and this characteristic decay time can then be introduced into the statistical structure. Where wind power is the physical process, certain aspects may also include measuring velocity differences between a plurality of points spatially defined and separated by each wind farm by a respective distance; calculating an integrand of the measured velocity differences and determining whether a probability density function is decaying faster; and determining an exponential decorrelation across the sampling rate $1/\Delta t$. However, the method disclosed herein is not only limited to physical processes such as wind power and instead, any physical process can be used in its place in accordance with this disclosure.

An exemplary system for determining forecast error is also disclosed including a computer-readable storage medium having memory and a program for causing a computer to execute any of the previously described methods. This system may also include a processor operatively coupled to the computer-readable storage medium for executing the program. A graphics processing unit may be in communication with the processor and the medium and operable for displaying information and the time-dependent forecast error generated by the processor executing the program. Additionally, a server may be operatively coupled to the computer readable storage medium across a network, wherein the program may be resident to the computer-readable storage medium or otherwise in communication with the medium via the server.

In other aspects, a system for determining forecast error is disclosed that includes a generated power time series and a forecast power time series. The generated power time series for power generation may be derived from the renewable energy source whereas the forecast power time series relates to power forecasted to be derived from the renewable energy source. A computing system may also be included with a computer-readable storage medium comprising memory and a program executed in memory for causing a computer to execute at least the following steps: introducing a data set defined by an identified generated power trend and an identified forecast power trend of an energy grid across a time period, each of the identified generated and forecast power trends being based on a physical process associated with the renewable energy source; producing a statistical structure by comparing the identified generated and forecast power trends and analyzing the data set to identify temporal error variations defined by temporal correlated fluctuations between the identified generated power trend and the forecast power trend; and calculating a time-dependent forecast error comprised of a time-scaling error and a scaling error based on the statistical structure derived from the physical process. A processor may be operatively coupled to the computer-readable storage medium for executing the program. In this regard, the temporal correlated fluctuations of the system are analyzed to quantify the time-dependent forecast error of energy fluctuations of the physical process defined by deviations between (a) high frequency components of the forecast and generated power time series and (b) the scaling error.

Other aspects and features of the disclosed technology will become apparent to those of ordinary skill in the art, upon reviewing the following detailed description in conjunction with the accompanying figures.

DETAILED DESCRIPTION

Figure 1:
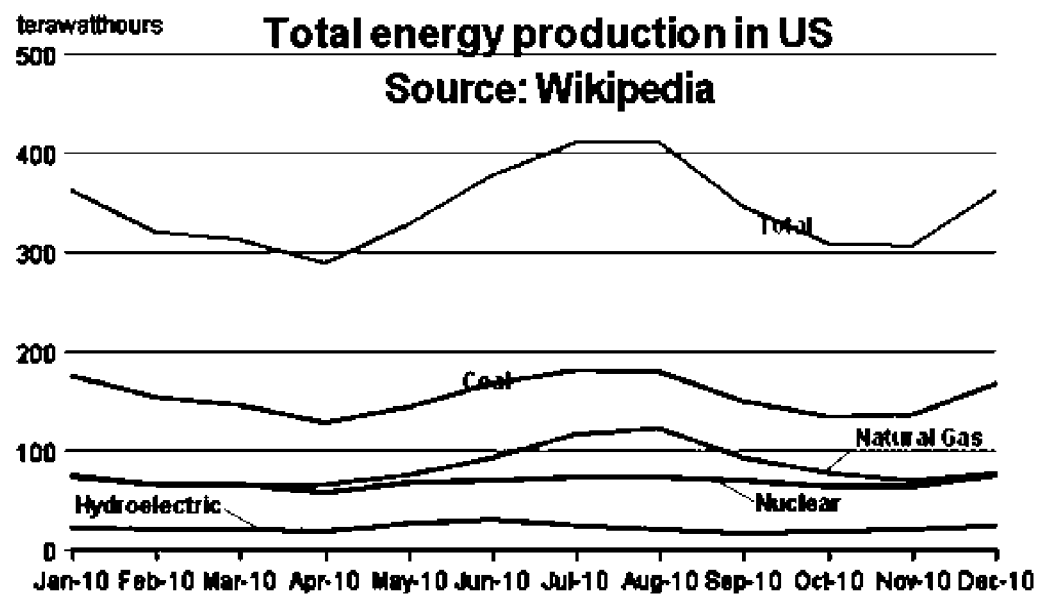
FIG. 1 is a graphical depiction of total energy production in the United States for calendar year 2010.

Although examples of the disclosed technology are explained in detail herein, it is to be understood that other solutions and related embodiments are contemplated. Accordingly, it is not intended that the disclosed technology be limited in its scope to the details of construction and arrangement of modules, formulas, and components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other examples include from the one particular value and/or to the other particular value.

In describing examples, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a step or process does not preclude the presence of additional steps or processes or intervening steps or processes between those expressly identified. Steps of a method or a process may be performed in a different order than those described herein without departing from the scope of the disclosed technology. Similarly, it is also understood that the mention of one or more components in a step, process, function or system does not preclude the presence of additional components or intervening components between those components expressly identified.

In the following description, references are made to the accompanying drawings that form a part hereof and that show, by way of illustration, specific embodiments or examples. In referring to the drawings, like numerals represent like elements throughout the several figures.

Figure 2:
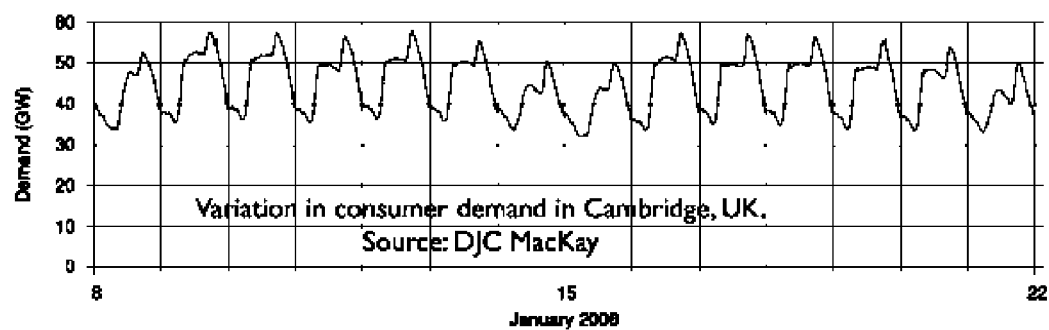
FIG. 2 graphically depicts consumer energy demand in Cambridge, UK over an exemplary month of calendar year 2006.

Energy in general can be derived from a variety of sources including coal, natural gas, nuclear, and hydroelectric. FIG. 1 for example depicts a graphical overview of total energy production in the United States for calendar year 2010. It can be seen that energy sources include coal, natural gas, nuclear, and hydroelectric. FIG. 2 is a graphical depiction of consumer demand in Cambridge, UK over the course of entire month in 2006. In comparing FIGS. 1 and 2, it can be seen that power can be generated at a near constant rate while consumer demand tends to fluctuate depending on a variety of factors.

Accurately forecasting energy production as applied to renewable energies is even more difficult. For example, wind or sunlight can be difficult to accurately predict due to a variety of variables. Wind generated power specifically can exhibit significant temporal correlations even at the grid level for a particular energy grid where fluctuations are expected to average out as power is distributed from wind farms geographically distributed within the grid. However, such fluctuations are problematic to system operators and these fluctuations also possess a statistical structure through temporal correlations that the herein disclosed solution is operable to exploit by quantitatively analyzing the error in forecast models as applied to wind. However, the herein disclosed solution is not limited only to wind and can also be applied to other sources of energy production subject to fluctuations such as sunlight and solar energy. In this regard, beyond serving as a standard for quantification of wind power forecast accuracy, the herein disclosed solution may also be applied in any field where energy is produced and forecasted with temporally correlated fluctuations possessing a statistical structure.

In regards to forecasting power such as wind power, prior approaches have attempted to calculate error in such forecasts by relying solely on error distribution. Such approaches have therefore failed to consider temporal error variations that account for fluctuation correlations.

Such fluctuation correlations may include, for example, atmospheric turbulence that may be transferred to the generated power trend in analyzing forecast error. Prior approaches have modeled the probability distribution of forecast error to capture the mean error and fluctuations about the mean error that is otherwise known as the standard deviation of the forecast error. These quantities, however, are time-independent and therefore fail to capture temporal error variations.

Figure 3:
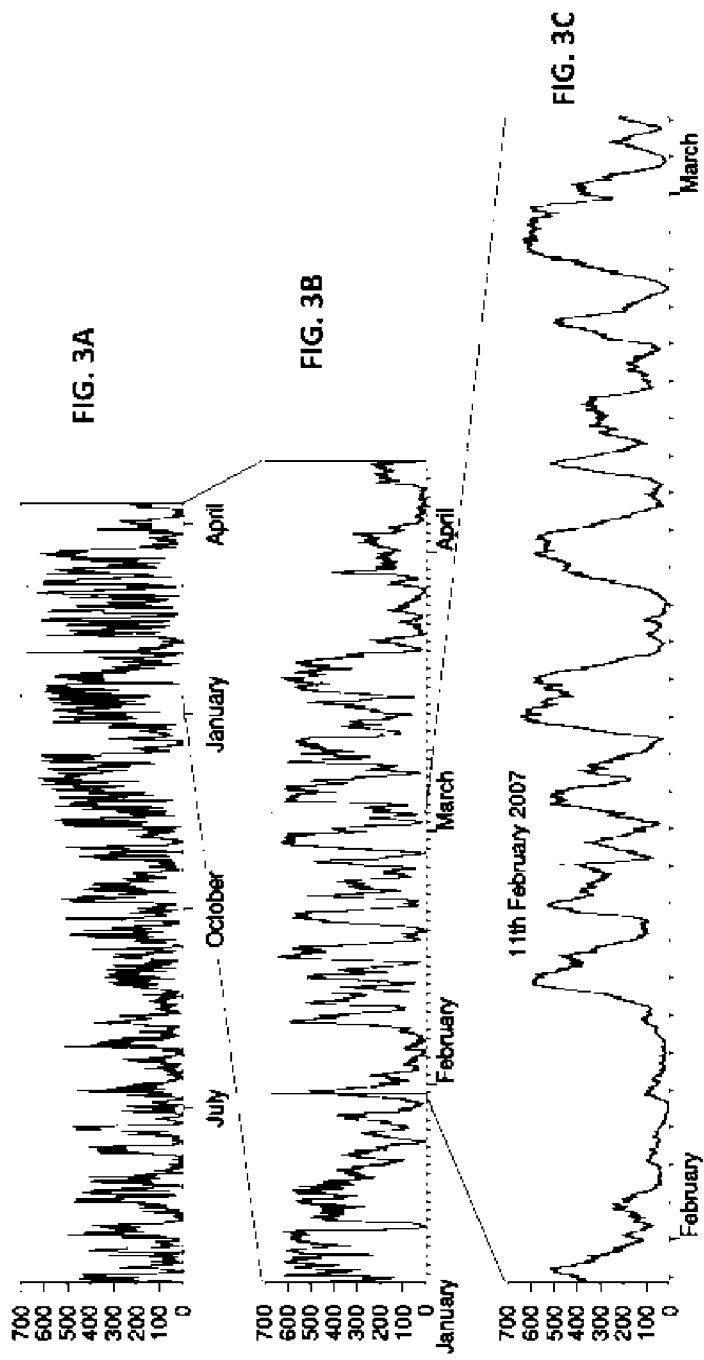
FIG. 3A graphically depicts the total output of wind power between April 2006 to April 2007 in Ireland, with differing levels of granularity.
FIG. 3B graphically depicts the total output of wind power between January 2007 to April 2007 in Ireland, with differing levels of granularity.
FIG. 3C graphically depicts the total output of wind power on February 2007 in Ireland, with differing levels of granularity.

Turning to FIGS. 3A-3C, graphical depictions of the total output of wind power between April of 2006 and April of 2007 (FIG. 3A) using data provided by EirGrid, the state-owned electric power transmission operator in Ireland. This data, as well as 5 years worth of additional EirGrid data, was introduced into a computing system and analyzed to determine the below described time-dependent forecast error. It can be seen for wind farms geographically distributed across Ireland, peak wind capacity in 2007 for Ireland was approximately 745 MW dispersed between approximately 60 individual wind farms. As a more granular examination of the data reveals, in moving from FIG. 3A (April 2006 to April 2007), FIG. 3B (January 2007 to April 2007), and FIG. 3C (February 2007), it appears that power derived from wind turbines to unpredictably fluctuate dramatically within and between each day. The typical assumption is that distributed wind farms like those of FIGS. 3A-3C will smooth out fluctuations and yet, FIGS. 3A-3C clearly show that grid fluctuations appear to be correlated.

The solutions disclosed herein describe methods to accurately determine higher order statistical correlations as to fluctuations in power generated from a variety of sources (e.g. wind power) and thence reliably estimate statistical error in forecast models such as wind forecast models, atmospheric turbulence, or sunlight in those embodiments involving solar energy production. Generally speaking, wind forecast error may be evaluated using a time-varying or fluctuating signal represented by the function, $x(t)$, wherein t is time and function $x(t)$ may be derived from a physical process such as wind power. A data set from $x(t)$ may be developed across a particular time period. While certain sampling rates $\Delta t$ are disclosed herein such as 15 minutes, such sampling rates are non-limiting examples and any sampling rate could be used to develop the particular time period that was larger or smaller than those discussed herein.

As previously described, wind energy derived from wind turbines can be turbulent and fluctuate. Forecasting this fluctuation across function $x(t)$ at regular, predetermined time intervals $\Delta t$ such as 15 minutes will allow a forecast signal function $x_F(t)$ to be determined. If a particular model predicts $x(t)$ exactly, then time-varying function $x(t)$ will equal its forecast signal $x_F(t)$ such that the error is approximately zero. Otherwise, the accuracy for forecast signal $x_F(t)$ and its forecast error at every instant t may be determined by instantaneous forecast error $D(t)$ subtracting $x_F(t)$ from $x(t)$. Problematically, prior solutions to wind forecasting have focused exclusively on function $D(t)$ and modeling its probability distribution. However, since function $D(t)$ necessarily varies from instant to instant, the herein disclosed solution 1 is designed to accurately determine the role of correlations in occurrences of this variation in its determination of time-dependent forecast error in a particular energy grid. If the time variation of the original, time-varying function $x(t)$ is purely random, however, it is not possible to predict quantity $D(t)$. It is to be understood that "purely random" may include fluctuations with no continuous variation in the signal between two consecutive time steps t and t+$\Delta t$.

In this respect, function $x(t)$ is characterized as uncorrelated and its correlation can decay within a single time-step ($\Delta t$) of the corresponding sampling interval. Such a signal is said to have no memory. However, if the fluctuations in time-varying function $x(t)$ vary over a particular time-step m, then the function's correlation decays more slowly (typically over m $\Delta t$ time-steps). The m $\Delta t$ time steps may therefore correspond to the time-period over which the signal loses memory of its past. Such correlations may represent an underlying mechanism in the physical process such as wind power.

The presently disclosed solution resolves these and other problems by generating a mathematical model to provide an accurate forecast that captures this underlying mechanism of m $\Delta t$ time-steps and accounts for these correlations in its forecast $x_F(t)$. With regards to wind, fluctuations in turbulence associated with flow over wind turbines specifically may exhibit fractal or self-similar scaling. In other words, a fluctuation of a given amplitude occurring over m $\Delta t$ time-steps may have the same structure as a fluctuation twice its amplitude occurring over 2m $\Delta t$ time-step, which in turn has the same structure as a fluctuation 4 times its amplitude and occurring over 4m $\Delta t$ time-steps.

In certain embodiments, the fractal structure of fluctuations in the time-varying function $x(t)$ of the herein disclosed system is quantified with a scaling exponent using a predetermined structure function. Preferably, the predetermined structure function that calculates the scaling exponent may be defined as $S_n(\tau) = <[|x(t+\tau)-x(t)|]^n>$. As can be seen, the value of the time-varying function $x(t)$ at time t can be subtracted from another value of the time-varying signal $x(t+\tau)$ at a later time $(t+\tau)$ so that their absolute difference $|x(t+\tau)-x(t)|$ represents the size of the fluctuation over that time-scale $\tau$.

Many such values may be collected from a time series defined by different points in time and each absolute difference may be raised to the $n^{th}$ power. For example, where n=2, this quantity may be related to a correlation function and nth order structure function $S_n(\tau)$ for n>2 provides information of an nth order 2 point correlation function. The same procedure may be repeated for the forecast time-series $x_F(t)$.

The herein disclosed solution 1 also captures correlations in the forecast error between $x(t)$ and $x_F(t)$ by modifying the structure function $S_n(\tau)$ to be cross-structure function $X_n(\tau)$. Preferably, cross-structure function $X_n(\tau)$ is defined by $<[|x_F(t+\tau)-x(t)|]^n>$. The distinction being drawn with structure function $S_n(\tau)$ and cross-structure function $X_n(\tau)$ is that the difference is not between two values of the same function separated by a time interval $\tau$. Instead, the difference is between a value at time t, namely, $x(t)$ and the forecast signal $x_F$ at a later time $(t+\tau)$, namely, $x_F(t+\tau)$. In certain embodiments, a memory kernel may be used in the herein disclosed solution 1 that reduces both referenced timescale and scaling errors.

Various aspects of the disclosed solution 1 for determining forecast error in an energy grid may be still more fully understood from the following description of some example implementations and corresponding results. Some experimental data is presented herein for purposes of illustration and should not be construed as limiting the scope of the disclosed technology in any way or excluding any alternative or additional embodiments.

Figure 4:
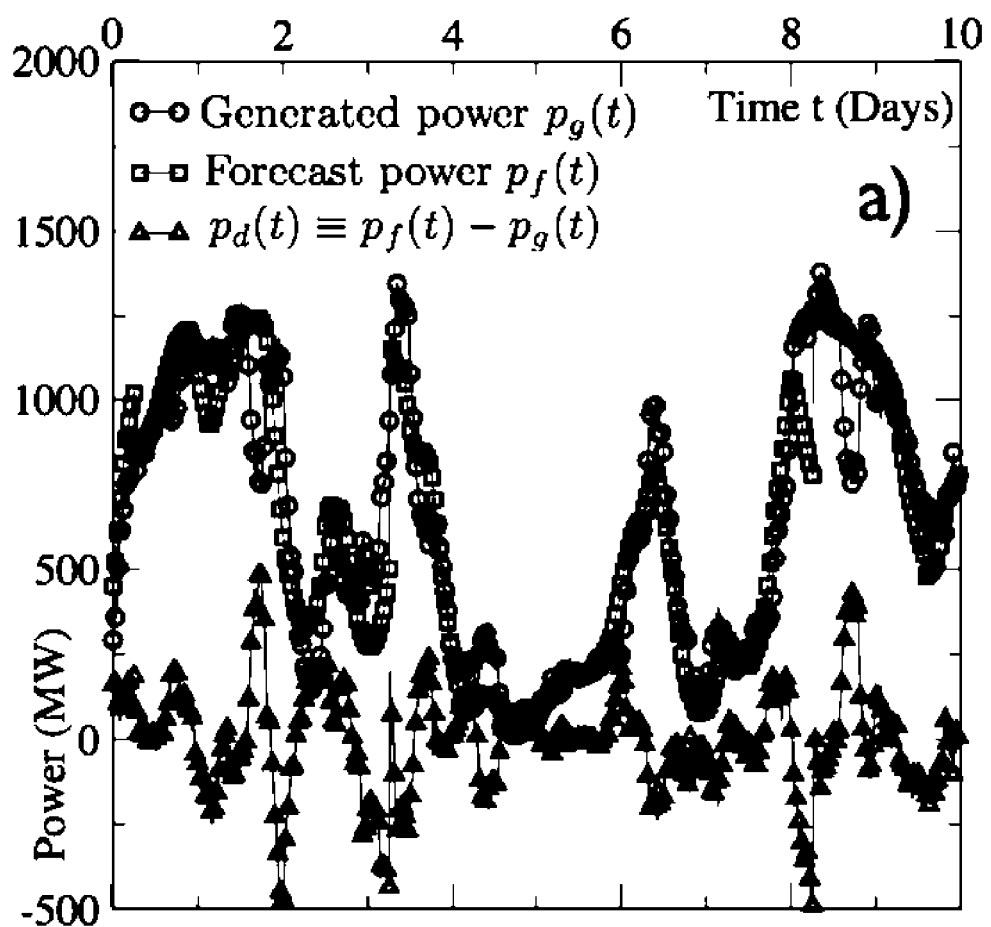
FIG. 4 depicts the instantaneous forecast error for a 10 day period.
Figure 5:
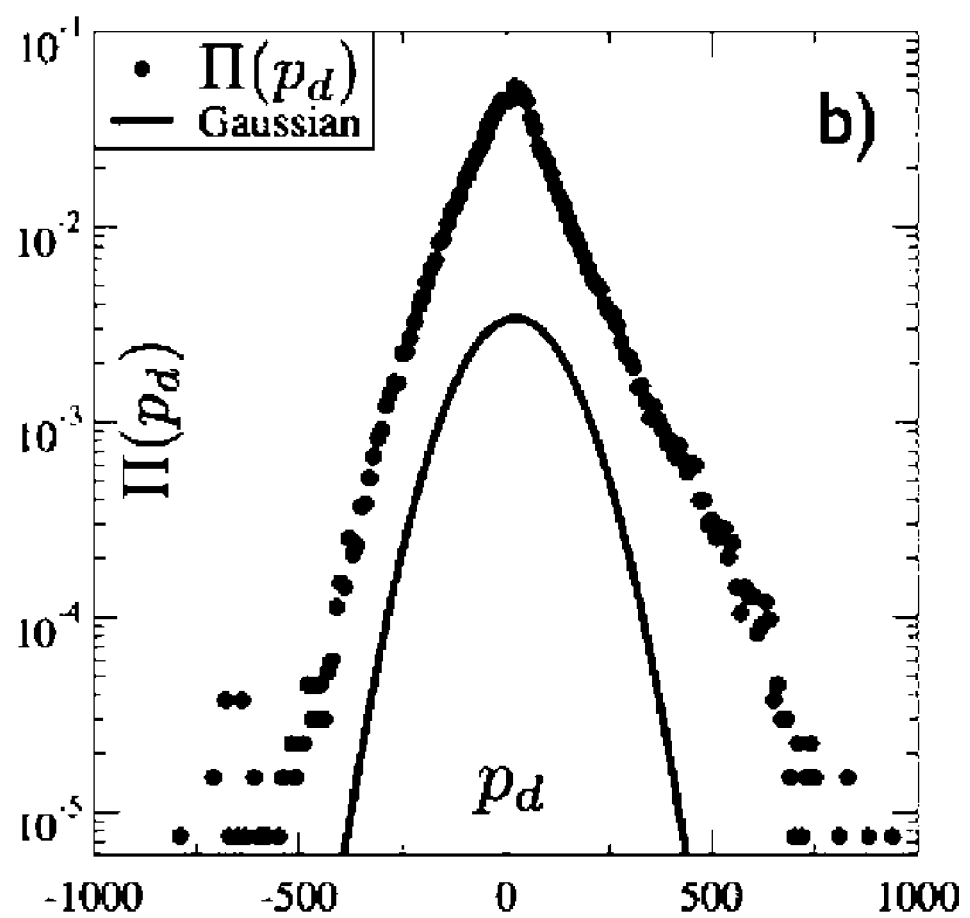
FIG. 5 depicts the total power error statistics from FIG. 4 summed as to turbines across all farms in the measured data to average fluctuations starting with the most probable ones that occur at about zero.

As previously discussed, EirGrid provided two raw time series including the wind power generated nationwide entering the grid, $p_g(t)$, and the power forecast in EirGrid's models, $p_f(t)$, for an identical duration. Accordingly, the instantaneous difference $p_d(t)$ between each may be defined as $p_f(t)-p_g(t)$ and is understood as the instantaneous forecast error. FIG. 4 depicts the instantaneous forecast error for a 10 day period and as can be seen, $p_g(t)$ exhibits correlated fluctuations. Each series of FIG. 4 was sampled at 15 minute intervals spanning a 5 year period between 2009 and 2014 and the statistics of temporal variation in power was determined.

Fluctuations in FIG. 4 are clearly visible permitting several observations. The generated power $p_g(t)$ exhibits correlated fluctuations while forecasted power $p_f(t)$ misses the high frequency relative to sampling rate of time series components. Accordingly, the instantaneous forecast error $p_d(t)$ can be seen with correlated wind fluctuations with a kurtosis as follows:

$$K \equiv \frac{\mu_4}{\sigma^4} \approx 5.8,$$

where $\mu_4 \equiv \overline{(p_d - \overline{p^d})^4}$, $\sigma_4 \equiv \overline{(p_d - \overline{p^d})^2}$, In this regard, $\overline{p_d}$ represents the time average of the instantaneous error. This implies relatively large fluctuations of instantaneous forecast error $p_d(t)$ and reveals two types of errors: the time-scale error $e_\tau$ and the scaling error $e_s$. The herein disclosed solution 1 is therefore directed towards rectifying timescale error $e_\tau$ as well as statistically aligning certain temporal correlations thereby improving the corresponding scaling error $e_s$. The herein disclosed solution 1 also contemplates use of different parameterizations of one or more regional climate models or weather models to further analyze and account for fluctuations therein.

It was observed that EirGrid's forecast models failed to predict the short-time (high frequency) signal variations for its first 10 sampling time-steps (2.5 hours), wherein this failure constitutes the time-scale error $e_\tau$. The fractal structure of fluctuations, as quantified by the scaling exponents, was also found to be different for the actual generated power signal and the forecast power signal, and this difference is the referenced scaling error.

And yet, EirGrid knows the time-scale because it is both producer and distributor. It is contemplated however that the herein disclosed solution 1 could be used by grid operators managing multiple sources of energy such as conventional sources (e.g. coal, natural gas, nuclear, etc) with renewable sources that tend to fluctuate and/or grids more interconnected when planning important features such as contingency reserves. The time dependent error of the physical processes that can be determined using solution 1 could be used by grid operators for optimized management of primary and secondary energy sources. Accordingly, the herein disclosed solution 1 is particularly advantageous for optimizing management multiple energy sources, including fluctuating renewable energy sources, as many grids and energy providers endeavor to decrease carbon footprints balanced against increased energy demand.

Similarly, the herein disclosed solution 1 to is particularly advantageous for accurately measuring the referenced error in energy spot markets where energy is traded daily, and energy prices are set by expected energy supply at predetermined time intervals (e.g. roughly 5-10 minute intervals). It is contemplated that the herein described solution 1 as to calculation of scaling error is also capable of being used by energy providers, grid operators, customers, mathematical modelers, and energy consulting firms, wherein the calculated scaling error is operable to provide a statistical measure of how the structure of the fluctuations are being missed by models.

Specifically, the herein described solution 1 is operable to analyze a given time series in multiple stages. In a first stage, the system may identify trends in the series whereas in the second stage, fluctuations of the identified trends are then analyzed. In certain embodiments analyzing the identified trends focuses on systematic differences between $p_g(t)$ and $p_f(t)$ while ignoring potential differences that may result, for example, due to new wind farms added to a grid and/or seasonal variability of the wind power. In regards to the first stage, trend identification may be performed such that the cross-correlation between the generated and forecast power trends was maximal. In the present example, a fast Fourier transform (FFT) for each of the time series was used, wherein the FFT identified the trends of stage 1 by inverting the FFT using only the frequencies with maximal amplitudes.

The number of maximal amplitudes can be set by the requirement of highest cross-correlation between generated trend $p_g(t)$ and forecasted power trend $p_f(t)$ and each trend was also subtracted from the raw time series. Autocorrelation functions were also employed during the example and their computations for data set did not reveal measurable difference in the characteristic decay time $\tau_x$. Instead, deviations were apparent only for long-term behavior that spanned a week or longer when exponential decorrelation has already occurred.

The autocorrelation functions for the generated and forecast power exhibited nearly identical scaling and characteristic decay timescales indicating accurate capture of correlations in generated power by the forecast models. However, because it is possible that forecasted power trend $p_f(t)$ does not capture some correlations, such as high frequency components of the generated trend $p_g(t)$, higher order terms of the two-point correlator are contemplated for use in the herein disclosed system to capture the statistical structure of the missing fluctuations.

It was also determined that the probability density function exert themselves with increasing order n of the structure function. Accordingly, in order to obtain more data to resolve higher order structure functions, a test for resolving the higher order structure function first requires the moment's integrand $(\Delta x)^n \Pi(\Delta x)$ approach 0 as $|\Delta x|$ approaches infinity, and second, an analysis as to whether the probability density function decays faster than $1/|\Delta x|^{n+1}$ as $|\Delta x|$ approaches infinity or else the integral would diverge for large $|\Delta x|$. In this regard, it was concluded that the two conditions are not independent since the second condition is theoretical. Further, when analyzing the information, including the second condition, insufficient data can lead to noise and prevent the integrand from converging to zero. Additionally, the first condition may be dependent on finiteness of data, wherein it was concluded that EirGrid data could be resolved for functions up to order n=12.

It was also observed that even order structure functions take only positive values such that they tend to converge faster than ones with odd order. Accordingly, the nth order structure function was computed using the absolute value of differences, wherein subtraction of time-average mean was assumed. While ensuring the same convergence rate for even and odd order statistics, all data was also collated in the positive quadrant permitting relatively easy visualization. Furthermore, the herein disclosed solution 1 was determined to be capable of incorporating any future, stronger tests of anomalous scaling as new ones are developed or become possible through calculation of fractional order structure functions.

Figure 6:
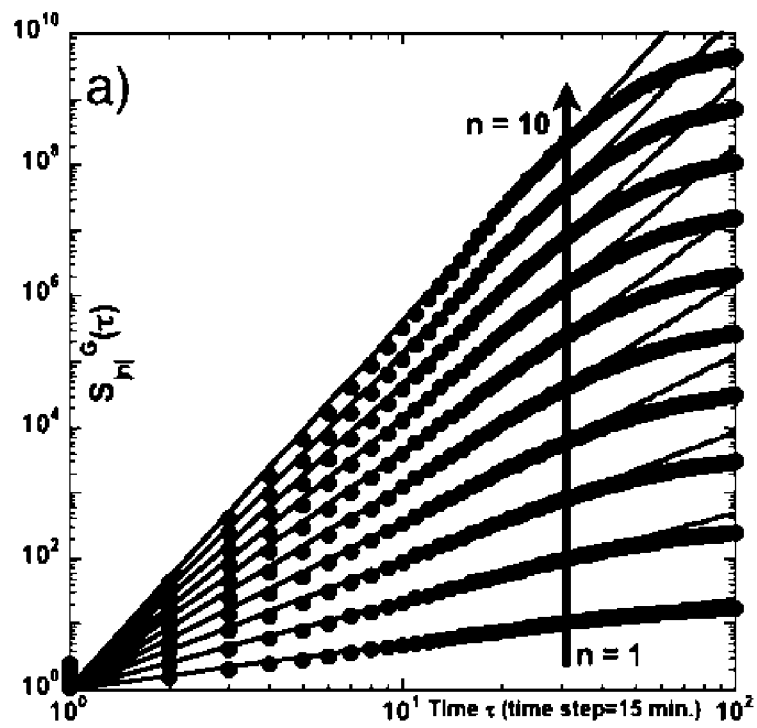
FIG. 6 in log-log scale graphically depicts structure functions of order n=1-10 for the absolute value of signal differences of the generated power $P_G$.
Figure 7:
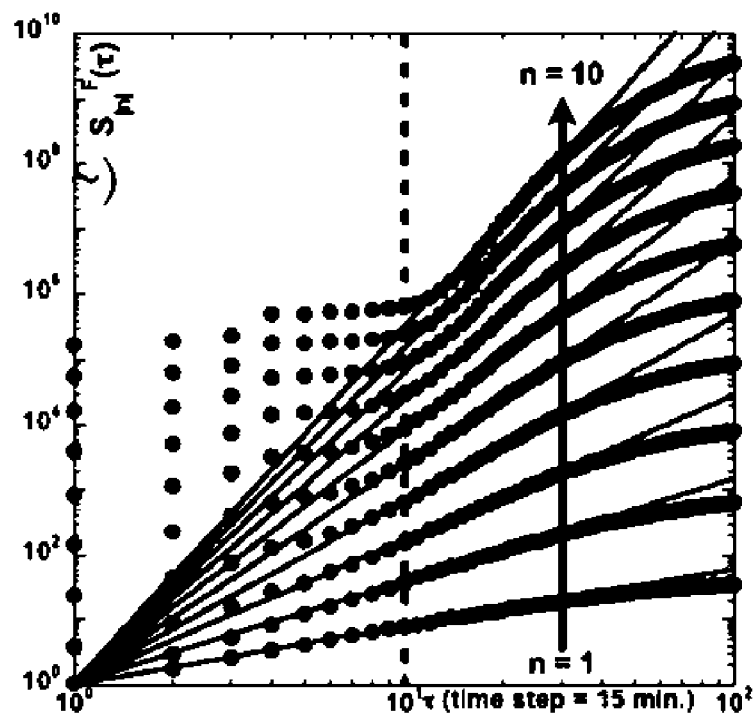
FIG. 7 in log-log scale graphically depicts structure functions of order n=1-10 for the absolute value of signal differences of the forecast power $P_F$.

Results of this analysis are depicted in FIGS. 6-7 which plot the structure functions S of order n=1-10 for the absolute value of signal differences of the generated power $P_G(S_G/$FIG. 6) and the forecast power $P_F(S_F/$FIG. 7). In both FIGS. 6 and 7, the structure functions are depicted in the solid circles and their power-law fits by the black, solid lines, wherein respective power is plotted versus $\tau$ in log-log scale in exhibited self-similar scaling. Self-similar or power-law scaling is observed for the generated power structure functions over 1.4 decades and scaling over the same temporal range is also observed for the forecast power structure functions of order n=1 and 2. For n>2, for example, no scaling was observed for time scales τ≤10. In contrast, the scaling is restored over a limited range of time scales between 10 and 40. With these fluctuations in mind, an exponential decorrelation was determined across a time step of 15 minutes as can be seen in FIG. 6. In particular, FIG. 6 shows how an exponential decorrelation declines at $1.04e^{(-t/80.94)}$ across the sampled time step t of 15 minutes according to the EirGrid data.

Given that all de-trending protocols suffer from having ad hoc de-trending time scale, scalings for dependence on de-trending procedure were tested by varying the number of maximal amplitudes. Ignoring the condition for peak cross-correlation between generated power $p_g(t)$ and forecast power $p_f(t)$, the number of maximal amplitudes contributing to the trends was varied and the scalings were invariant up to inclusion of 15 maximal amplitudes to the trend, beyond which, coefficients for the polynomial fits started varying in the second decimal place.

Having ascertained the robustness for the five maximal amplitudes at which the cross-correlation peaks, a second source of scaling measurement error focused on statistical variability. Since the scalings were analyzed up to τ=100 data points, the de-trended time series were split into eight independent windows (each with 21912 data points), and the structure functions S were re-computed for each window.

Figure 8:
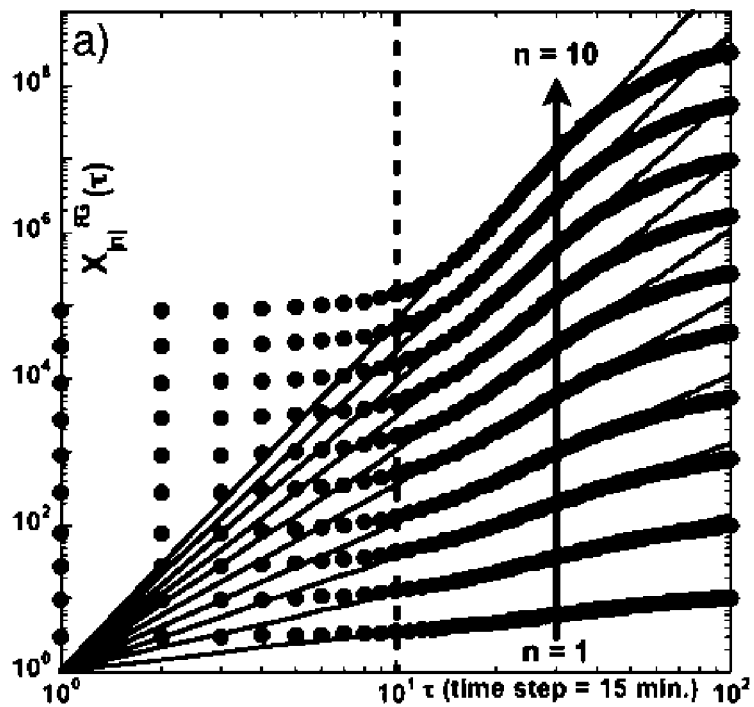
FIG. 8 graphically depicts a log-log scale of cross structuring functions $X^{FG}_n(\tau)$ versus $\tau$ (solid circles).
Figure 9:
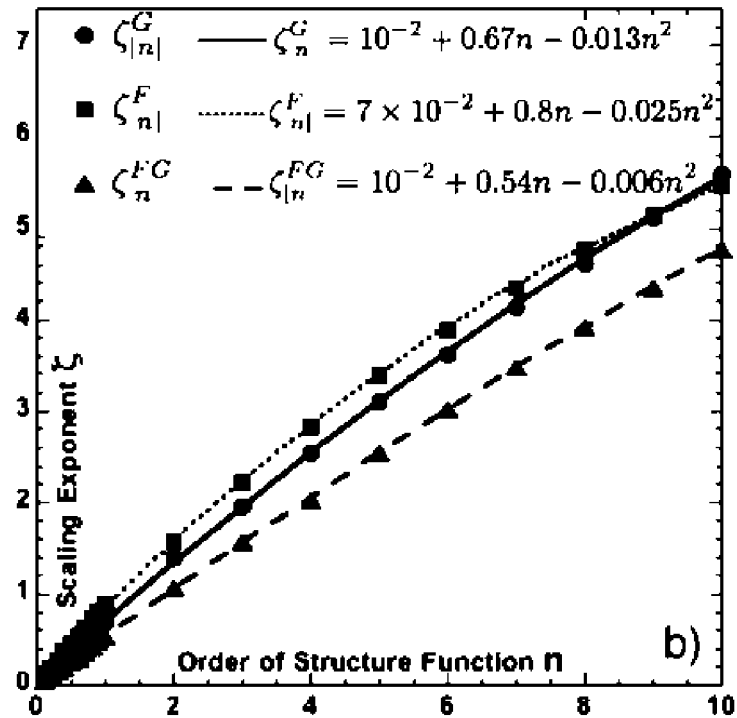
FIG. 9 depicts structure scaling exponent $\xi^X_{|n|}$ versus the order of structure function n for generated power G in solid circles, forecast power F in solid squares, and cross structure functions FG in solid triangles.
Figure 10:
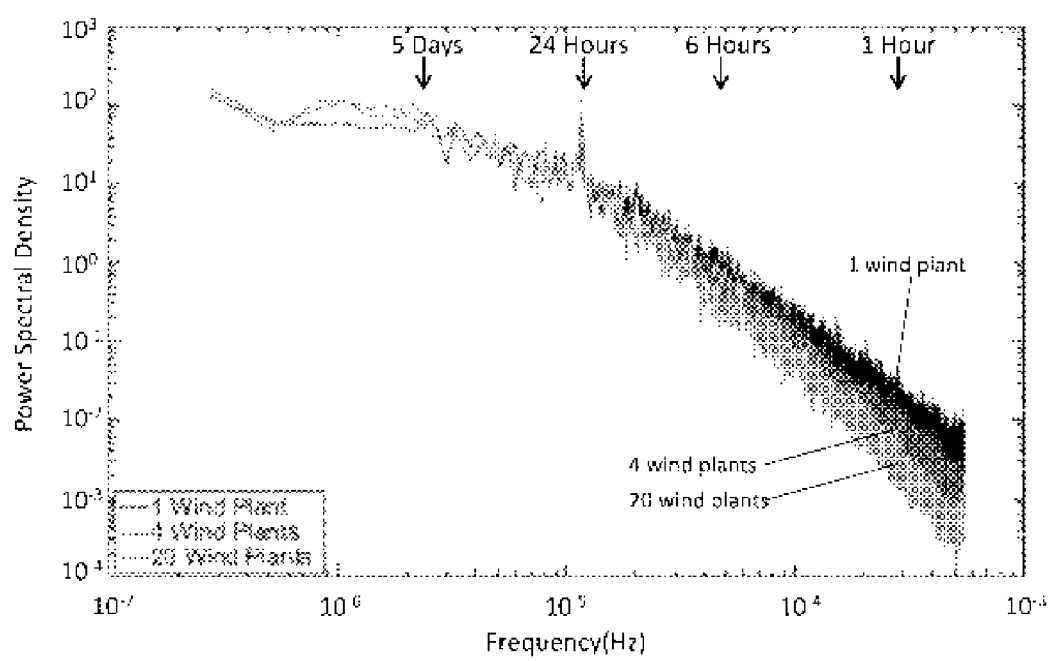
FIG. 10 depicts a comparison of wind generation data created from farms with 1 wind plant, 4 wind plants, and 20 wind plants.

The variation in the log derivative for the eight independent measurements was defined as follows, variation $$\zeta_{|n|}^X = \frac{d\log(S_{|n|}^X(\tau))}{d\log\tau},$$

wherein the variation ξ was taken as the possible scatter in scaling estimation providing a confidence interval for the polynomial fits. As shown in FIGS. 8-9 and described more particularly below, the scatter was found to be $\xi_{|n|}^X \pm 0.01$ in both the measured value of $\xi_{|n|}^X$ as well as the corresponding polynomial fits for each of the polynomial coefficients for each of the eight independent data sets. Through this analysis, it was revealed that the polynomial fits were meaningful only to linear order for generated power variation $\xi_{|n|}^G$ and forecast power variation $\xi_{|n|}^{FG}\xi$. The quadratic order polynomial coefficient for variation $\xi_{|n|}^F$, despite being larger than the scatter of ±0.01, was not useful owing to the corresponding quadratic terms for $\xi_{|n|}^G$ and $\xi_{|n|}^F$ being smaller than the scatter magnitude. FIG. 8 is a graphical depiction of a log-log scale of cross structuring functions $X_{|n|}^{FG}X(\tau)$ versus τ (solid circles). In those times less than 10, no scaling is exhibited whereas times between 10 and 40 are shown with scaling restored. The depicted solid lines are power-law fits to data within the scaling regime. In contrast, FIG. 9 depicts scaling exponent $\xi_{|n|}^X$ versus the order of structure function n for generated power G in solid circles, forecast power F in solid squares, and cross structure functions FG in solid triangles. The solid line in FIG. 9 depicts $\xi_{|n|}^G$, the dashed line depicts $\xi_{|n|}^F$, and the longer dashed line depicts $\xi_{|n|}^{FG}$.

Despite qualitatively observing a quadratic deviation for $\xi_{|n|}^X$ in FIG. 9, little significance was ascribed since the multi-fractal component of the scalings is minuscule. As applied to turbulence theory for wind generation power, the source of multi-fractal behavior to intermittent fluctuations that can arise from two sources in the atmospheric context was traced.

One intermittent fluctuation known as internal intermittency occurs at the small scales of turbulent flow. These intermittent fluctuations would be naturally reflected in the power generated at the turbine and farm scales which lie within the integral scale of atmospheric turbulence. However, when adding together power generated by geographically distant wind farms, internal intermittency should smooth out since the farms are not expected to be simultaneously correlated. Instead, geographically distant wind farms may experience a time lag due to movement of a weather system(s). Furthermore, the sampling interval of 15 minutes for the EirGrid data was not expected to resolve effects caused by internal intermittency as such effects occur at much shorter time scales.

A second intermittent fluctuation is known as external intermittency and it occurs at the edge of any free-stream and arises in the atmospheric context due to coupling between turbulence and a co-moving weather system. External intermittency can also be experienced in the form of wind gusts. External intermittency may be of greater relevance in the present solution as it can both couple distributed farms through the weather system as well as occur at time-scales longer than the 15 minute sampling interval for the EirGrid data. The nearly fractal scaling of generated power variation $\xi_{|n|}^G$ of FIG. 9 indicates that that both internal and external intermittency are being smoothed to the point of rendering grid level power fluctuations almost mono-fractal.

The analysis thus far demonstrates the importance of temporal correlations in wind power and their role in estimating forecast errors. To capture the short term correlations missed by the forecast, a modified forecast was introduced based on the original forecast convoluted with an exponentially decaying memory kernel derived from the generated power time series. The modified forecast power was given as follows, $\int_0^t P_f(\tau)e^{-y(t-\tau)}d\tau$. The memory duration (1/y) was selected in order to minimize the relative difference between the structure functions of respective generated and forecast power. It was found that the optimal y varies with the order of the structure function. For example, when n is less than 4, the memory modified forecast did not show any improvement as between $S_{|n|}^G S$ and $S_{|n|}^F S$. By contrast, the modified forecasted exhibited better agreement as between $S_{|n|}^G$ and $S_{|n|}^F S$ and S when n was greater than or equal to 4.

It is noted that other information during this analysis remained unknown, including forecast models that may have been employed, the number of wind farms feeding the EirGrid grid at any given time, their respective location, the date of commission or date of scheduled and unscheduled outages. Regardless, the herein disclosed solution forecasts error in the wind power generation space by understanding that turbines and wind farms in a particular grid are coupled through atmospheric turbulence. Additionally, certain embodiments of the herein disclosed system include solutions where the turbines and respective farms of the grid are coupled through mean wind velocity of one or more weather systems.

Figure 11:
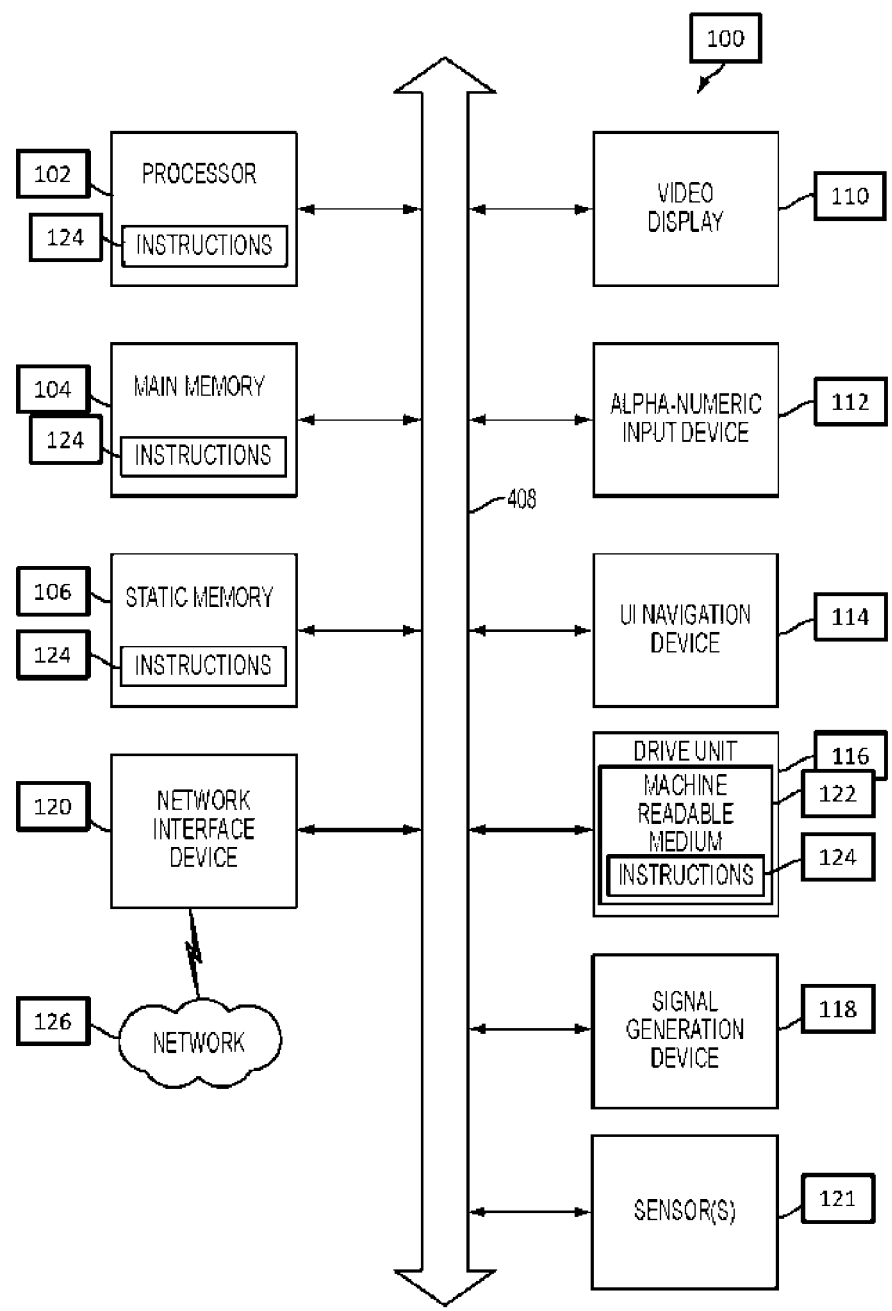
FIG. 11 depicts a block diagram of an exemplary computing system implementing the herein disclosed forecasting solution.

Turning to FIG. 11, a block diagram is illustrated with exemplary computing system 100 upon which one or more embodiments of the herein disclosed solution 1 and/or related methodologies can be implemented. Examples of system 100 can include logic, one or more components, circuits (e.g., modules), mechanisms, and the like.

It is understood that circuits are tangible entities configured to perform certain operations. In certain embodiments, circuits of system 100 can be arranged (e.g., internally or with respect to external entities such as other circuits) in a specified, predetermined manner. One or more computer systems (e.g., a standalone, client or server computer system) and/or one or more hardware processors (processors) of system 100 can be configured by software (e.g., instructions, an application portion, or an application) as a circuit that operates to perform certain operations as described herein.

For example, in one embodiment the software comprising instructions that embody solution 1 of system 100 can reside (1) on a non-transitory computer readable storage medium or (2) in a transmission signal. The software, when executed by the underlying hardware of the circuit, may cause the circuit to perform certain operations. A circuit in this embodiment can be implemented mechanically or electronically. Likewise, a circuit can comprise dedicated circuitry or logic that is specifically configured to perform one or more techniques such as discussed above, such as including a special-purpose processor, a field programmable gate array (FPGA) or an application-specific integrated circuit (ASIC).

In a non-limiting example, a circuit can comprise programmable logic (e.g., circuitry, as encompassed within a general-purpose processor or other programmable processor) that can be temporarily configured (e.g., by software) to perform certain operations associated with the solution 1 previously described. It will be appreciated that the decision to implement a circuit mechanically (e.g., in dedicated and permanently configured circuitry) or in temporarily configured circuitry (e.g., configured by software) can be driven by cost and time considerations.

Accordingly, the term "circuit" as described is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In certain embodiments, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples of the described system 100 can be performed, at least partially, by one or more processors (e.g., processor 102) that are temporarily configured (e.g., by software embodying instructions 124 of solution 1) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described in the solution 1 can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors 102 can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Examples (e.g., apparatus, systems, or related methods) can be implemented in digital electronic circuitry, in computer hardware, in firmware, in software, or in any combination thereof. Examples can be implemented using a computer program product (e.g., a computer program, tangibly embodied in an information carrier or in a computer readable medium, for execution by, or to control the operation of, data processing apparatus such as a programmable processor, a computer, or multiple computers).

A computer program embodying some or all of the processes previously described in solution 1 may be reflected in instructions 124 and can be written in any form of programming language, including compiled or interpreted languages, and can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In certain embodiments, exemplary operations of instructions 124 can be performed by one or more programmable processors 102 executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system 100 can include clients and servers comprising energy information such as generated power data, forecast power data, weather data as to wind, sunlight or the like, or other data including data specifically related to renewable energy. A client and server are generally remote from each other and generally interact through a communication network 126. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., system 100) and software architectures that can be deployed in examples.

In certain embodiments, the system 100 can operate as a standalone device or the system 100 can be connected (e.g., networked) to other machines. In a networked deployment, system 100 can operate in the capacity of either a server or a client machine in server-client network environments. System 100 can act as a peer machine in peer-to-peer (or other distributed) network environments. System 100 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by system 100.

Further, while only a single system 100 is illustrated in FIG. 11, the term "system" shall also be taken to include any collection of machines or systems that individually or jointly execute a set (or multiple sets) of instructions to perform any one or more of the methodologies discussed herein. Exemplary system (e.g., computer system) 100 can include a processor 102 (e.g., a central processing unit (CPU), a graphics processing unit (GPU) or both), a main memory 104 and a static memory 106, some or all of which can communicate with each other via a bus 108. The system 100 can further include a display unit 110, an alphanumeric input device 112 (e.g., a keyboard), and a user interface (UI) navigation device 114 (e.g., a mouse). In an example, the display unit 110, input device 117 and UI navigation device 114 can be a touch screen display. The system 100 can additionally include a storage device (e.g., drive unit) 116, a signal generation device 118 (e.g., a speaker), a network interface device 120, and one or more input devices 112 operable to transmit information with external information servers across the network to access information such as generated power data, forecast power data, weather data, wind data, sunlight data, and the like.

The storage device 116 can include a non-transitory computer readable medium 122 on which is stored one or more sets of data structures or instructions 124 (e.g., software) embodying or utilized by any one or more of the methodologies or functions described in regards to solution 1. The instructions 124 can also reside, completely or at least partially, within the main memory 104, within static memory 106, or within the processor 102 during execution thereof by the system 100. In an example, one or any combination of the processor 102, the main memory 104, the static memory 106, or the storage device 116 can constitute computer readable media.

While medium 122 is illustrated as a single medium, the term "computer readable medium" can include a single medium or multiple media (e.g., a centralized or distributed database, and/or associated caches and servers) that configured to store the one or more instructions 124. The term "computer readable medium" can also be taken to include any tangible medium that is capable of storing, encoding, or carrying instructions for execution by the system 100 and that cause the system 100 to perform any one or more of the methodologies of the present disclosure or that is capable of storing, encoding or carrying data structures utilized by or associated with such instructions.

The term "computer readable medium" can accordingly be taken to include, but not be limited to, solid-state memories, and optical and magnetic media. Specific examples of computer readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 124 can further be transmitted or received over a communications network 126 using a transmission medium via the network interface device 120 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

Figure 12:
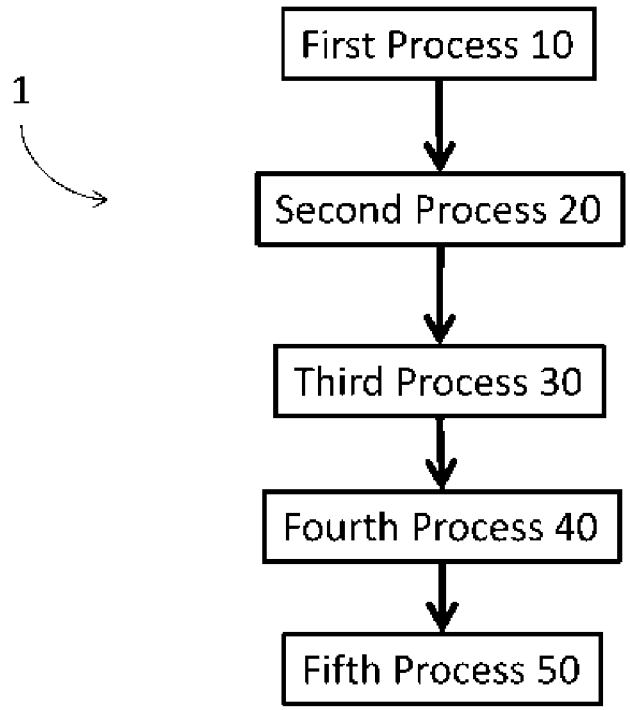
FIG. 12 depicts an exemplary block diagram of a program executing certain processes of the herein described solution of energy forecast error.

Turning to FIG. 12, a schematic overview of solution 1 is provided, wherein solution 1 could be a program such as instructions 124 for causing system 100 to execute one or more processes to manage energy production in a particular grid based on a physical quantity such as wind in the EirGrid system. For example, first process 10 may include one or more steps, including a (1-1)-th step that fixes n to an integer equal to 1 or greater. A (1-2)-th step may also be included in process 10 that makes a calculation shown in a formula (1) regarding a physical quantity, $P_G(t)$, $P_G(t)$ being represented as a function of a time t and a predicted value of the physical quantity, $P_F(t+\tau)$, at a time $t+\tau$ when a fixed time $\tau$ passes from the time t according to the following function: $(|P_F(t+\tau)-P_G(t)|)^n$ ... (1). It is to be understood that function $P_G(t)$ may correspond to generated power for a particular grid whereas function $P_F(t)$ may correspond to forecasted power as to a particular renewable energy source such as wind.

Process 10 may include execution of a (1-3)-th step that calculates a first average value as an average value of the formula (1) when the time t is varied for a fixed period. A (1-4)-th step may also be executed that calculates a first average value when the $\tau$ is varied. A (1-5)-th step may be executed by the program that performs the (1-1)-th step to the (1-4)-th step at least once for the integer that is different from the integer n in the (1-1)-th step. A (1-6)-th step may also be executed that calculates a time scaling error in accordance with a numeric of the integer n from the first average value calculated in the (1-4)-th step and the first average value calculated in the (1-5)-the step.

Solution 1 of FIG. 12 may also include a second process 20 including a (2-1)-th step that fixes n to the integer equal to 1 or greater. Process 20 may also include a (2-2)-th step that makes a calculation shown in a formula (2) regarding the physical quantity, $P_G(t)$ represented as the function of the time t and the physical quantity, $P_G(t+\tau)$ at the time $t+\tau$ when the fixed time $\tau$ passes from the time t, $(|P_G(t+\tau)-P_G(t)|)^n$ ... (2). A (2-3)-th step may also be included in process 20 that calculates a second average value as the average value of the formula (2) when the time t is varied for the fixed period.

A (2-4)-th step may be included in process 20 that calculates a second average value when the time τ is varied. A (2-5)-th step may also be included that makes an evaluation to determine whether the second average value is proportional to $\tau^A$ and calculates A when proportional. A (2-6)-th step may also be included that performs the (2-1)-th step to the (2-5)-th step at least once for the integer that is different from the integer n in the (2-1)-th step. A (2-7)-th step may also be included that calculates a slope A when a relationship between the A calculated in the (2-5)-th step and the (2-6)-th step and the integer n is approximated as a linear line.

Solution 1 of FIG. 12 that may be embodied in instructions 124 may also include a third process 30 including a (3-1)-th step that performs the (1-1)-th step to the (1-4)-th step of first process 10. A (3-2)-th step may also be included in process 30 that determines whether the first average value is proportional to $\tau^B$ and calculates B when proportional. A (3-3)-th step may also be included in process 30 that performs the (3-1)-th step and the (3-2)-th step at least once for the integer that is different from the integer n in the (3-1)-th step. A (3-4)-th step may be included that calculates a B slope when the relationship between the B calculated in the (3-2)-th step and the (3-3)-th step and the integer n is approximated as a linear line.

Solution 1 of FIG. 12 that may be embodied in instructions 124 may also include a fourth process 40 having a (4-1)-th step that calculates a scaling error from a difference between the A slope calculated in the (2-7)-th step and the B slope calculated in the (3-4)-th step. This scaling error may then be introduced into a variety of grid operator systems for accurate estimation of forecasted power generation for a particular energy source. In certain embodiments, physical quantities $P_G$ and/or $P_F$ described above with respect to processes 10 through 40 may be derived from a wind force used for wind power generation, sunlight used for solar power energy production, or rotation of any renewable energy turbine rotated by naturally occurring energy (e.g. hydro turbines caused to rotate by water flow). Solution 1 of FIG. 12 may be executed by being downloaded from a server or by being accessed locally on a local non-transitory computer readable storage medium.

Finally, a fifth process 50 may be included in the solution 1 of FIG. 12 for analyzing the time-scaling error and the scaling error. This analyzed information may then be used to determine a predicted value of physical quantities $P_F$ (t) and $P_G$ (t) used in the energy grid. As stated, the physical process used to calculate the physical quantities $P_F$ (t) and $P_G$ (t) could be any renewable energy source such as wind force, sunlight, and the like.

Figure 13:
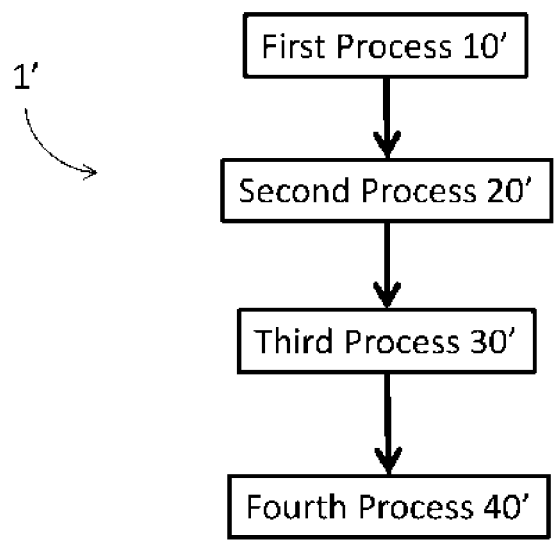
FIG. 13 depicts another exemplary block diagram of a program executing certain processes of the herein described solution of energy forecast error.

Turning to FIG. 13, a schematic overview of solution 1' is provided similar to solution 1 of FIG. 12. Accordingly, solution 1' could be a program such as instructions 124 for causing system 100 to execute one or more processes to manage energy production in a particular grid based on a physical quantity such as wind in the EirGrid system. A first process 10' may include a module for introducing a data set defined by an identified generated power trend $P_G(t)$ and an identified forecast power trend $P_F(t)$ of the energy grid across a time period. A second process 20' may also be included in solution 1' for producing a statistical structure, wherein the statistical structure may be produced by comparing trends $P_G(t)$ and $P_F(t)$ and analyzing the data set to identify temporal error variations defined by the previously described temporal correlated fluctuations.

A third process 30' may also be included in solution 1' for calculating a time-dependent forecast error defined by the previously-discussed time-scaling and scaling errors based on the statistical structure derived from the physical process (e.g. wind). Finally, a fourth process 40' may be included in solution 1' for analyzing the time-dependent forecast error to determine a predicted value of energy fluctuations of the physical process associated with trends $P_G(t)$ and $P_F(t)$ in order to optimize management of energy flowing into a particular.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary.

The systems and methods described herein are independent of a specific model and/or system with required physical components. The herein disclosed system and method will advantageously work for any signal whose fluctuations possess a statistical structure, which in turn can be exploited to quantify forecast error. The herein disclosed system and method advantageously does not depend upon the sampling rate of the particular signal and instead can be applicable beyond wind power to any renewable energy source that possesses temporally correlated fluctuations.

It should be appreciated that any of the components, processes, steps referred to may be integrally or separately formed with one another in a single computer readable storage medium or interconnected, directly or indirectly, over one or more networks, as needed or required. Further, redundant functions or structures of the components or modules may be implemented. Any of the herein described features and their components discussed herein may take on all shapes to provide and meet the environmental, structural demands, and operational requirements. Moreover, locations and alignments of the various components may vary as desired or required.

The specific configurations can be varied according to particular design specifications or constraints requiring a system or method constructed according to the principles of the disclosed technology. Such changes are intended to be embraced within the scope of the disclosed technology. The presently disclosed embodiments, therefore, are considered in all respects to be illustrative and not restrictive. The scope of the present solution is indicated by the appended claims, rather than the foregoing description, and all changes that come within the meaning and range of equivalents thereof are intended to be embraced therein.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims.

The invention claimed is:

1. A non-transitory computer-readable storage medium storing a program to manage wind power generation in an energy grid, the program causing a computer to execute at least following processes,
a first process including:
    a (1-1)-th step that fixes n to an integer equal to 1 or greater;
    a (1-2)-th step that makes a calculation shown in $(|P_F(t+\tau)-P_G(t)|)^n$ regarding the wind power generation: where $P_G(t)$ represents a function of a time t and a predicted value of generated wind power entering the energy grid, $P_F(t+\tau)$ at a time $t+\tau$ when a fixed time $\tau$ passes from the time t, where $P_F(t)$ represents forecasted wind power, wherein $P_G(t)$ and $P_F(t)$ are derived from a wind speed used for the wind power generation;
    a (1-3)-th step that calculates a first average value as an average value of the formula (1) when the time t is varied for a fixed period;
    a (1-4)-th step that calculates a first average value when the $\tau$ is varied;
    a (1-5)-th step that performs the (1-1)-th step, the (1-2)-th step, the (1-3)-th step and the (1-4)-th step at least once for the integer that is different from the n in the (1-1)-th step; and
    a (1-6)-th step that calculates a time scaling error in accordance with a numeric of the n from the first average value calculated in the (1-4)-th step and the first average value calculated in the (1-5)-the step;
a second process including steps below:
    a (2-1)-th step that fixes n to the integer equal to 1 or greater;
    a (2-2)-th step that makes a calculation shown in $(|P_G(t+\tau)-P_G(t)|)^n$ regarding the wind power generation: $P_G(t+\tau)$ at the time $t+\tau$ when the fixed time $\tau$ passes from the time t;
    a (2-3)-th step that calculates a second average value as the average value of the formula (2) when the time t is varied for the fixed period;
    a (2-4)-th step that calculates a second average value when the $\tau$ is varied;
    a (2-5)-th step that makes an evaluation to determine whether the second average value is proportional to $\tau^A$ and calculates A when proportional;
    a (2-6)-th step that performs the (2-1)-th step, the (2-2)-th step, the (2-3)-th step, the (2-4)-th step and the (2-5)-th step at least once for the integer that is different from the n in the (2-1)-th step; and
    a (2-7)-th step that calculates a slope: Aslope when a relationship between the A calculated in the (2-5)-th step and the (2-6)-th step and the n is approximated as a linear line;
a third process including:
    a (3-1)-th step that performs the (1-1)-th step, the (1-2)-th step, the (1-3)-th step and the (1-4)-th step;
    a (3-2)-th step that determines whether the first average value is proportional to $\tau^B$ and calculates B when proportional;
    a (3-3)-th step that performs the (3-1)-th step and the (3-2)-th step at least once for the integer that is different from the n in the (3-1)-th step; and
    a (3-4)-th step that calculates a Bslope when the relationship between the B calculated in the (3-2)-th step and the (3-3)-th step and the n is approximated as a linear line;
a fourth process including:
    a (4-1)-th step that calculates a scaling error from a difference between the Aslope calculated in the (2-7)-th step and the Bslope calculated in the (3-4)-th step; and;
a fifth process including: analyzing the time-scaling error and the scaling error to determine a predicted value of physical quantities $P_F(t)$ and $P_G(t)$ used in the energy grid to manage the energy grid.

2. The medium according to claim 1, wherein the program is executed by being downloaded from a server.

3. The medium according to claim 1, wherein the program is executed by being read from the medium.

4. A method of determining time-dependent forecast error in an energy grid, the method comprising:
introducing a data set defined by an identified generated power trend and an identified forecast power trend of the energy grid across a time period, each of the identified generated and forecast power trends being based on a physical process, wherein the physical process is wind power, wherein the energy grid comprises a plurality of geographically distributed wind farms having one or more wind turbines, and wherein the time period is measured using a sampling rate $1/\Delta t$;
producing a statistical structure by comparing the identified generated and forecast power trends and analyzing the data set to identify temporal error variations defined by temporal correlated fluctuations between the identified generated power trend and the forecast power trend, wherein the correlated fluctuations include data associated with the one or more wind turbines of the plurality of geographically distributed wind farms;
responsive to determining the correlated fluctuations exhibit fractal scaling, quantifying the correlated fluctuations with a scaling exponent using a predetermined structure function;
calculating the time-dependent forecast error comprised of a time-scaling error and a scaling error based on the statistical structure derived from the physical process; and
analyzing the time-dependent forecast error to determine a predicted value of energy fluctuations of the physical process associated with the identified generated and forecast power trends used to manage the energy grid.

5. The method of claim 4, wherein the correlated fluctuations are defined by atmospheric turbulence.

6. The method of claim 4, wherein the correlated fluctuations are defined by wind speed associated with one or all of the geographically distributed wind farms of the grid.

7. The method of claim 4, further comprising: utilizing the statistical structure in a memory kernel to reduce timescale and scaling errors.

8. The method of claim 4, wherein the predetermined structure function is defined by $S_n(\tau)=<[|x(t+\tau)-x(t)|]^n>$, wherein each time-varying function $x(t)$ at time t is subtracted from a time-varying signal $x(t+\tau)$ at a later time $(t+\tau)$ so that an absolute difference determines one of the plurality of correlated fluctuations.

9. The method of claim 4, wherein analyzing the identified trends ignores differences between the plurality of geographically distributed wind farms and one or more additional wind farms added to the energy grid.

10. The method of claim 4, wherein analyzing the identified trends ignores differences between seasonal variability of the wind power.

11. The method of claim 4, further comprising: identifying the identified generated and forecast power trends; and inverting frequencies having maximal amplitudes.

12. The method of claim 11, wherein the generated and forecast power trends are identified using a fast Fourier transform.

13. The method of claim 12, further comprising:
determining a number of maximal amplitudes contributing to the identified trends being varied;
analyzing the number of maximal amplitudes across the time period to split the time period into a plurality of independent windows; and
computing structure functions for each window to determine variation between the identified generated and forecast power trends.

14. The method of claim 13, further comprising:
introducing a modified forecast power trend into the statistical structure based on the identified forecast power trend and modified with an exponentially decaying memory kernel derived from the identified generated power trend.

15. The method of claim 4, further comprising:
using an autocorrelation function between the identified generated power trend and the forecast power trend to determine a characteristic decay time; and
introducing the characteristic decay time into the statistical structure.

16. The method of claim 4, further comprising:
measuring velocity differences between a plurality of points spatially defined and separated by each wind farm by a respective distance;
calculating an integrand of the measured velocity differences and determining whether a probability density function is decaying faster; and
determining an exponential decorrelation across the sampling rate $1/\Delta t$.

* * * * *